US008027362B2

(12) United States Patent
Jeghers

(10) Patent No.: US 8,027,362 B2
(45) Date of Patent: Sep. 27, 2011

(54) METHODS AND SYSTEMS FOR PUSHING AND PULLING NETWORK DATA IN USER INTERFACE DESIGN

(75) Inventor: Mark Jeghers, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1247 days.

(21) Appl. No.: 11/680,626

(22) Filed: Feb. 28, 2007

(65) Prior Publication Data

US 2007/0208842 A1 Sep. 6, 2007

Related U.S. Application Data

(60) Provisional application No. 60/778,503, filed on Mar. 1, 2006.

(51) Int. Cl.
*H04J 3/16* (2006.01)
(52) U.S. Cl. .......................................... 370/469; 370/236
(58) Field of Classification Search ........................ None
See application file for complete search history.

(56) References Cited

U.S. PATENT DOCUMENTS

| 6,662,208 | B1 * | 12/2003 | Moeller et al. ................ 709/203 |
| 6,725,233 | B2 * | 4/2004 | Froyd et al. ........................... 1/1 |
| 7,516,194 | B1 * | 4/2009 | Lamkins et al. .............. 709/218 |
| 2002/0174091 | A1 * | 11/2002 | Froyd et al. ....................... 707/1 |
| 2007/0208842 | A1 * | 9/2007 | Jeghers ......................... 709/223 |

* cited by examiner

Primary Examiner — Robert Wilson

(57) ABSTRACT

A network management system is provided for allowing a user to interface with network management data provided by a network agent via a network. Application level logic obtains and formats the network management data to thereby create a display presented to the user. A library of software processing structures for sharing data with the network agent is provided, and an abstraction layer distinct from the library is configured in communication with the application level logic. The abstraction layer includes a pusher feature configured to facilitate the writing of data from the application level logic to the network agent and a puller feature configured to facilitate the reading of data from the network agent to the application level logic. The abstraction layer uses the library to communicate with the network agent via the network while isolating the application level logic from the library.

15 Claims, 3 Drawing Sheets

```
public interface DataPuller                                    /*—500
{
    /** Causes data to be read (or "pulled") from the SNMP agent and possibly
     * populated into some GUI components. Subclasses are highly recommended
     * to synchronize this method, so two threads cannot fire off the same
     * data puller at the same time.
     *
     * @throws jave.io.IOException
     * @throws DataTypeExecution
     */
    public void pull() throws
java.io.IOException,DataTypeException,CCBException;
}
```

FIG. 5

```
                                                               /*—600
public interface DataPusher
{
    /** Causes data to be collected GUI components (or some other source)
     * and written (or "pushed") out to the SNMP agent. Subclasses are highly
     * recommended to synchronize this method, or implement some sort of thread
     * safety, so two threads cannot fire off the same data pusher at the same
     * time.
     *
     * @param validate If true, include validation of each data value before
     * saving by firing validation events. This can be set to false in simple
     * cases where no validation is needed.
     *
     * @throws java.io.IOException
     * @throws DataTypeExecution
     */
    public void push(boolean validate)
              throws java.io.IOException, DataTypeException, CCBException;

/** Clears all the dirty flags. This method is typically
     * called when a screen is newly populated with values, or
     * when those values are reset (discarding changes). In that
     * case, a pusher should assume nothing needs to be saved. */
    public void clearAllDirtyFlags () ;
}
       /
      602
```

FIG. 6

METHODS AND SYSTEMS FOR PUSHING AND PULLING NETWORK DATA IN USER INTERFACE DESIGN

CROSS-REFERENCE TO RELATED APPLICATIONS

This application claims priority to U.S. Provisional Pat. Ser. No. 60/778,503 for METHOD AND APPARATUS FOR PUSHING AND PULLING NETWORK DATA IN USER INTERFACE DESIGN, which was filed Mar. 1, 2006 and is incorporated herein by reference.

TECHNICAL FIELD

The present invention generally relates to networked software and, more particularly, to pushing and pulling network data between a database and a user application or applet.

BACKGROUND

Due the size of modern wireless networks, it has become difficult to plan, monitor, manage, and troubleshoot the system as a whole. There has been a dramatic increase in demand for mobile connectivity solutions utilizing various wireless components and wireless local area networks (WLANs). Such WLANs generally include multiple wireless access points that communicate with mobile devices using one or more RF channels (e.g., in accordance with one or more of the IEEE 802.11 standards). The number of mobile units and associated access ports, as well as the number of RFID readers and associated antennae, can be very large in an enterprise. As the number of components increases, the management and configuration of those components becomes complicated and time-consuming.

Management software typically includes one or more user interfaces that incorporate management information base (MIB) entries and user interface applets. Currently known systems, however, are limited with respect to their ability to create user interfaces (e.g., Java interfaces) based on these MIBs.

Accordingly, it is desirable to provide improved methods of generating user interface structures. In particular, it is desirable to provide improved techniques and systems for pushing and pulling data between a database (e.g. an SNMP MIB) and a user application. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures. The figures listed below are included in Attachment A, which is incorporated by reference below.

FIG. 5 is an exemplary interface for a puller feature; and

FIG. 6 is an exemplary interface for a pusher feature.

DETAILED DESCRIPTION

Figure 1:
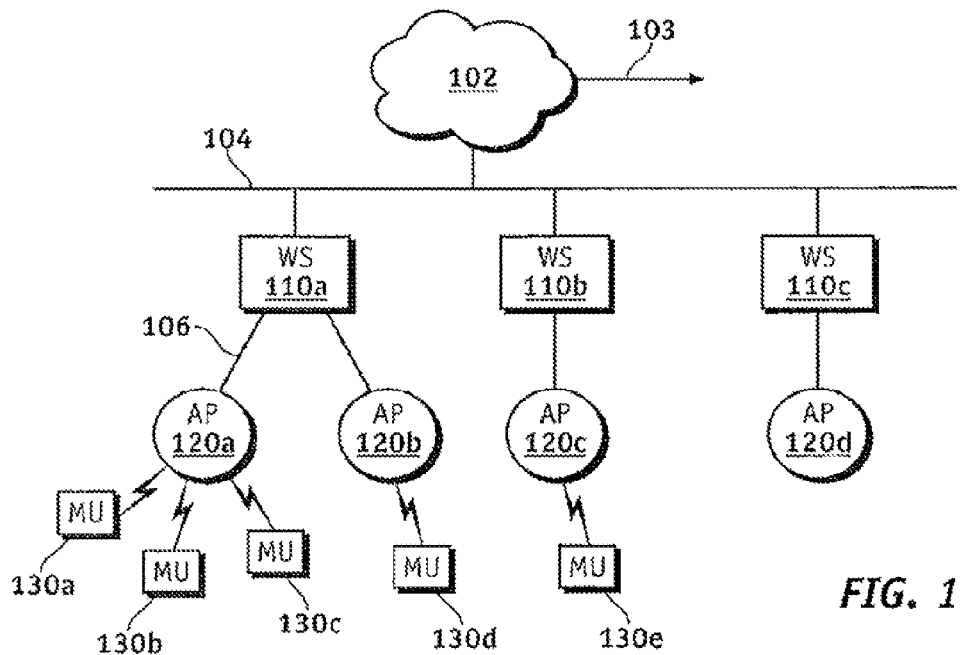
FIG. 1 depicts an exemplary WLAN environment.

The following detailed description is merely exemplary in nature and is not intended to limit the range of possible embodiments and applications. Furthermore, there is no intention to be bound by any theory presented in the preceding background or the following detailed description.

According to various embodiments, so-called "pushers" and "pullers" are provided that allow user interface pages to automate the writing and reading (respectively) of data residing over a network, such as simple network management protocol (SNMP) data contained within a management information base (MIB). Pushers and pullers are objects or other software "helpers" that may be designed to be invoked directly by an application or applet and/or to be automatically invoked by a page management framework, as described more fully below.

Pullers and pushers encapsulate much of the network I/O activities of the user interface page. A page or dialog can have as many or as few as needed (e.g. different pullers and pushers support different situations), and, although they can be called individually, in various embodiments they are invoked at the appropriate times automatically by the page management framework. In various embodiments, their behaviors can be augmented in special cases using listeners and special overridden methods. In more unusual cases, lower-level read/write methods can also be used. Data can typically be modified in any chosen thread, but components are generally updated in "Event Dispatch" threads, and many pullers automatically take care of this. Pullers can also be invoked in a separate thread so slow data-loading does not block the user interface during operation.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The terms "comprise," "include," "have" and any variations thereof are used synonymously to denote non-exclusive inclusion. The terms "left," right," "in," "out," "front," "back," "up," "down," and other such directional terms are used to describe relative positions, not necessarily absolute positions in space. The term "exemplary" is used in the sense of "example," rather than "ideal." For the purposes of conciseness, conventional techniques and systems related to data communication, network systems, wireless local area networks (WLANs), communication standards (e.g., the IEEE 802.11 family of specifications), and applet operation are not described in detail herein.

Although the present invention may be used in a variety of contexts—e.g., any system where applets or other applications are created and sent from one device to another device for execution—FIG. 1 depicts a wireless local area network (WLAN). In this embodiment, one or more switching devices 110 (alternatively referred to as "wireless switches," "WS," or simply "switches") are coupled to a network 104 (e.g., an Ethernet network coupled to one or more other networks or devices, indicated by network cloud 102). One or more wireless access points 120 (alternatively referred to as "access ports" or "APs") are configured to wirelessly connect to one or more mobile units 130 (alternatively referred to as "MUs"). The access points 120 are suitably connected to corresponding wireless switches 110 via communication lines 106 (e.g., conventional Ethernet lines). Any number of additional and/or intervening switches, routers, servers and other network components may also be present in the system. Additional servers and client systems (not shown) may communicate indirectly or directly with the various illustrated components (e.g., via a network connection 103).

A particular access point 120 may have a number of associated mobile units 130. For example, in the illustrated topology, mobile units 130(a), 130(b), and 130(c) are associated with access point 120(a), while mobile unit 130(e) is associated with access point 120(c). Furthermore, one or more access points 120 may be connected to a single wireless switch 110. Thus, as illustrated, access point 120(a) and access point 120(b) are connected to wireless switch 110(a), and access point 120(c) is connected to wireless switch 110(b).

Each wireless switch 110 determines the destination of data packets it receives over network 104 and routes that data packet to the appropriate access point 120 if the destination is a mobile unit 130 with which the access point 120 is associated. Each wireless switch 110 therefore maintains a routing list of mobile units 130 and their associated access points 130. These lists are generated using a suitable packet handling process known in the art. Thus, each access point 120 acts primarily as a conduit, sending/receiving RF transmissions via mobile units 130, and sending/receiving data packets via a network protocol with wireless switch 110.

The access points 120 are typically capable of communicating with one or more mobile units 130 through multiple RF channels. This distribution of channels varies greatly by device, as well as country of operation. For example, in one embodiment in accordance with 802.11(b) there are fourteen overlapping, staggered channels, each centered 5 MHz apart in the RF band, although only eleven channels may currently be used legally in the U.S.

Figure 2:
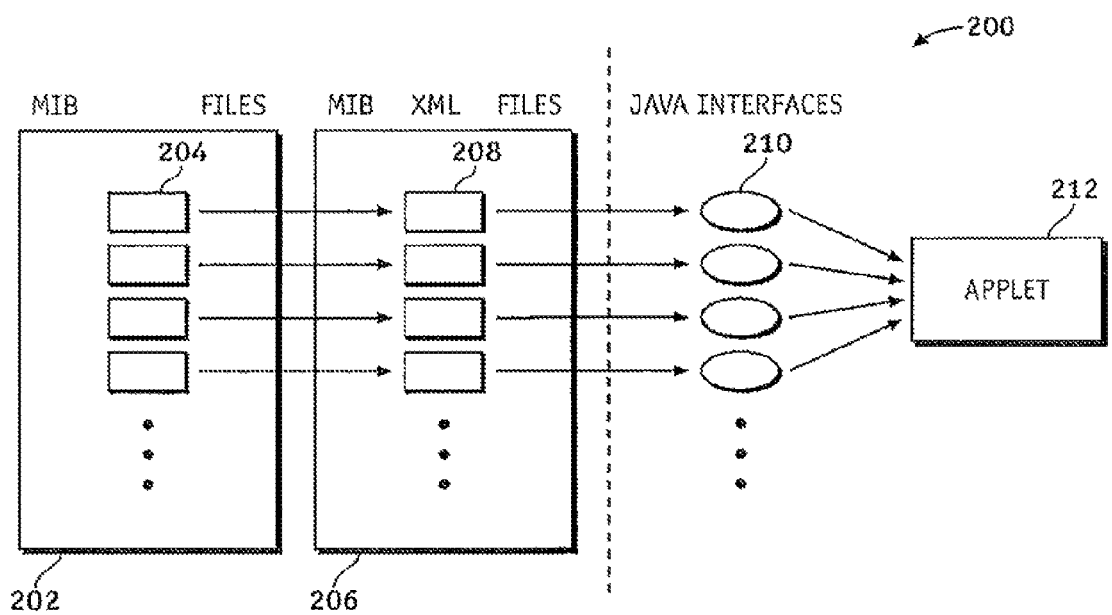
FIG. 2 is a combination conceptual block diagram and flowchart that depicts an exemplary applet creation process.

Referring to FIG. 2, an exemplary method of creating an applet will now be described. Initially, any number of management information base (MIB) objects ("elements" or "files") 204 are provided within a database 202. Each of these MIB objects 204 are associated with one or more components within the WLAN (e.g., the WLAN illustrated in FIG. 1), and in one embodiment objects 204 are stored as static final Java objects. In other embodiments, objects 204 may be .NET constructs or any other objects, structures or modules as appropriate.

As is known in the art, a management information base (MIB) is based on the OSI/ISO network model, and is a type of database used to manage devices in the network. It includes a set of objects (MIB objects) corresponding to the various switches, routers, and other components within the system. These objects are typically defined using a subset of Abstract Syntax Network Notion One (ASN.1), entitled "Structure of Management Information Version 2 (SMIv2)," RFC 2578. MIBs may be periodically updated to add new functionality, remove ambiguities, and to fix defects. These changes may be made in accordance with Section 10 of RFC 2578, for example. Various tools exist to manipulate MIBs, including, for example, MIB2GUI and other MIB-related software tools offered by MG-Soft, Inc. and others.

In accordance with various embodiments, two or more MIB XML files 208 are created and stored within a database 206 (or within database 202). Each MIB XML file 208 is associated with a corresponding MIB object 204. The nature of XML (eXtensible Markup Language) is well known in the art, and need not be described herein. A translator (e.g., MG-Soft MIB2GUI) can be used to convert MIB objects to a form that supports a user interface (UI) puller/pusher infrastructure, and/or that permits UI validation based on the MIB.

In one embodiment, when MIBs 204 are created or updated, an XML export file 208 is created using suitable software (e.g., MG-SOFT's MIB Explorer "Export to XML" feature). These XML export files are checked into a subversion repository within database 206. In one embodiment, this process is made part of the build so that system always has current XML files.

Any number of software interfaces 210 are then created, each of which is associated with a corresponding one of the MIB XML files 208. These interfaces 210 may be stored prior to creation of the applet, or created at the same time that the applet assembled. In one embodiment, software interfaces 210 are Java interfaces that include one or more constant classes corresponding to the corresponding SNMP objects. These constant classes might include, for example, an object ID (OID) of the SNMP object, the type of the SNMP object, and access information regarding the SNMP object. As is known in the art, SNMP ("Simple Network Management Protocol") is a widely-used protocol employed to manage elements in large networks, and is based on a manager/agent model. The manager provides the interface between the human network manager and the management system, and the agent provides the interface between the manager and the physical devices being managed. SNMP is powerful notwithstanding its relatively small command set. Further information regarding SNMP may be found, for example, within the IETF SNMPv1 and SNMPv2 standard documents.

Finally, an applet 212 is created using a subset of the plurality of software interfaces. As described above, for every MIB element 204 available to applet 212, there can be a static final Java object that defines that MIB element, including its OID. These objects may be pre-created according to any scheme, e.g., one for each discrete MIB element, one for each table column, and one for each overall table. These objects are used to identify a MIB element 204 that the user wishes to manipulate.

The term "applet" is used to refer to any small software code, library, structure or other module, and is not limited to Java applets. In various equivalent embodiments, .NET constructs or the like could be used. In one embodiment, a WLAN management applet is created—i.e., an applet that is used in connection with the wireless switch or other component and which allows one or more components of the WLAN to be managed. Other embodiments could be used to manage other network components (e.g. routers, switches, bridges and/or the like) or for any other purposes.

Creation of applet 212 may be performed on a conventional user computer system operated by a network manager or other individual, and may include various software and hardware components conventionally used in such systems. In one embodiment, applet 212 includes an applet used in connection with a web browser to provide a user interface to one or more of the WLAN components.

When the management applet is built, the MIB XML files are converted into a set of matching Java interfaces using a MIB2GUI tool. Each interface contains one or more constant classes, where each class corresponds to an SNMP object. These classes contain, for example, the object's OID, type, optional range, access info and/or any other object attributes as appropriate.

OIDs may be stored as an array of short integers, for example, to reduce memory usage. Given the large number of constants that may be generated in any particular environment, storing the OID as an SNMP OID class (such as the ones provided in an SNMP4J or AdventNet library) consumes on the order of one additional megabyte of memory. In one embodiment, The DataType class is a type-safe enum class containing UT types mapped from SNMP types during the conversion process. "Range" contains a low and high limit for integer or string values. For strings, the low limit is the minimum length, and the high limit is the maximum length. The Boolean "readOnly" flag is TRUE if the field is read only, and FALSE if the object is read/write or write only.

The system generally includes an SNMPTableElement Class or the like. In one embodiment, the export tool (e.g., MIG2GUI) generates an SNMPTableElement class for each SNMP table. This class contains all the fields in SNMPElement, as well as an array of columns. Each column value in the SNMPTableElement is a previously-defined SNMPListElement constant. In turn, individual values within a row, or non-tabular scalar values, are expressed with an SNMPElement constant. Constants files may be updated by the translator when their corresponding source XML files 208 are modified. In addition, the translator can be built when its source files are changed, or when SNMPElement and related classes are modified. Both targets are suitably implemented in a "make file" or the like that is associated with the applet.

Figure 3:
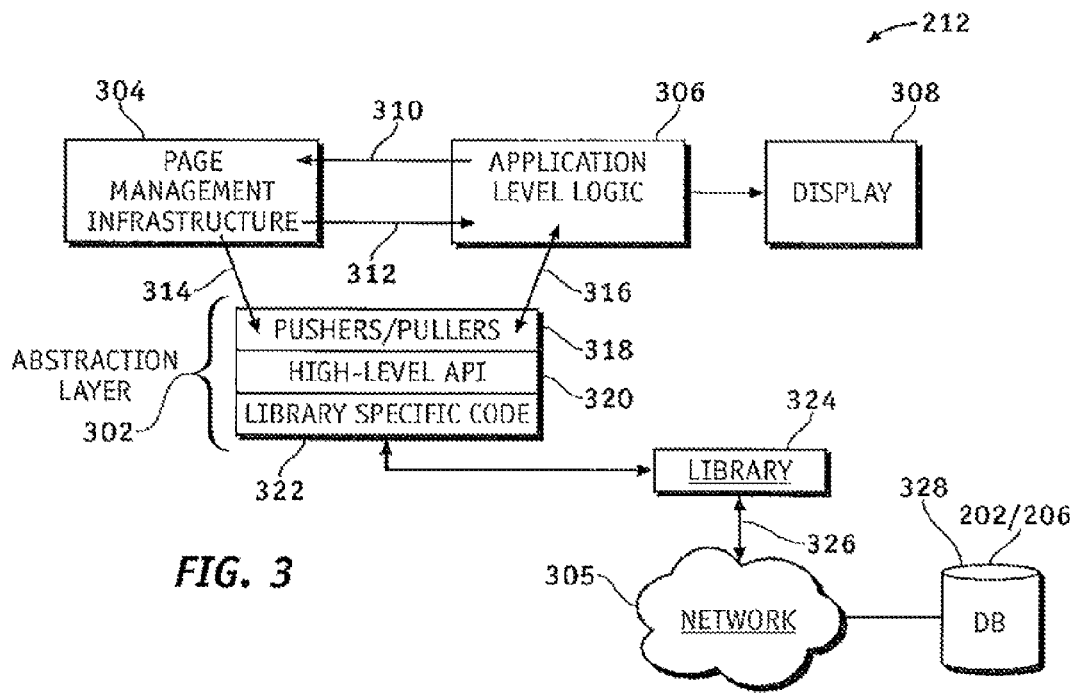
FIG. 3 is a block diagram showing the architectural components of an applet.

With reference now to FIG. 3, additional detail about the applet creation environment will now be discussed, with particular reference to the page management infrastructure and data pushers/pullers for transferring data between the applet 212 and the network agent 328 having access to a MIB or other database as appropriate. In various embodiments, applet 212 suitably includes application level logic 306 that creates a user interface display 308 as desired by the user in conjunction with data obtained through a data abstraction layer 302 and a page management infrastructure 304.

Application-level logic 306 suitably includes any collection of pages, dialogs and/or other interface features developed to provide the actual functionality of applet 212, such as the various device management features. These features may include various pages or dialogs that may be accessed via a conventional web browser or the like, shown as display 308 in FIG. 3. Application level logic 306 is suitably configured to obtain and format the network management data to thereby create the display 308 presented to the user. Various features implemented in application-level logic 306 have been described above with reference to FIG. 2.

Generally speaking, page management infrastructure 304 is a run-time environment that handles the general "housekeeping" features of a user-created page or dialog implemented in logic 306. Such features may include, for example, managing certain pusher and puller features for input and/or output of data, automating "dirty flags" for detecting changes in data from user interaction, as well as refreshing pages, tabs and other user interface features with current data. Page management infrastructure 304 is generally provided by a service provider, and need not be modified by the end user. Other features provided may include enforcement of a read-only mode for certain data types, binding of pages to navigation features (e.g. sashes and the like) to aid in navigation, and/or other features as appropriate.

Abstraction layer 302 is any code or other abstraction capable of providing an interface between application level logic 306 and any network communications library 324 as appropriate. In various embodiments, abstraction layer 302 contains pushers/pullers 318 for transmitting/receiving data, respectively, using library 324. In such embodiments, the abstraction layer 302 uses the library to communicate with the remote network agent 328 via the network 305 while isolating the application level logic 306 from library 324. Generally speaking, abstraction layer 302 isolates the application level logic 306 from library 324 by translating instructions from the application level logic to library instructions. Abstraction layer 302 further isolates the application level logic from library 324 by translating data received from library 324 to a pre-determined interface format that is compatible with the application level logic. An example of this format is shown in FIGS. 5-6.

Further abstraction may be obtained by providing a high-level application programming interface (API) 320 separate from any library-specific code 322. In various embodiments, library 324 may be an SMNP library such as the open source SNMP4J library or the like. By isolating any library specific code to a single abstraction layer 322, the particular library 324 used in future software releases may be changed without significant rebuilding of code outside of the abstraction layer 322. That is, only the internals of layer 322 typically need to be changed in the event that library 324 is changed.

Layer 318 contains various pusher and/or puller features that may be used by page management infrastructure 304 and/or application level logic 306 to facilitate the reading and writing of data between applet 212 and data agent 328. Additional detail about pushers and pullers contained within layer 318 can be found below.

Application programming interface 320 provides a set of resources for implementing the pushers and pullers 318 via library 324. In various embodiments, interface 320 is implemented using the Java "Cfg" class or the like. In such embodiments, a set of static methods are provided by which most operations using library 324 can be accomplished. Generally speaking, features of interface 320 may be available to page management infrastructure 304 and/or application level logic 306 for use when a pusher or puller is not available for a particularly-desired feature. Typically, however, the features of the interface 320 are primarily provided for use by the pusher/puller features of layer 318.

Using the features of library 324 as abstracted in various pullers/pushers 318, applet 212 is able to read and write data to and from network agent 328. Network agent 328 is any database, server, application or other process capable of providing data requested by applet 212. In various embodiments, agent 328 is a conventional SNMP agent operating on a network 305 (which may correspond to networks 102, 104, 106 and/or the like in FIG. 1)

Application level logic 306 communicates with page management infrastructure 310 and abstraction layer 302 using conventional programming constructs (e.g. message passing, interrupts, etc.) that may be implemented within the JAVA, .NET or other appropriate environment. Application logic 306 suitably communicates with page management infrastructure 304, for example, to track "dirty" flags and other changes (message 310) and to bind sashes and other interface elements to displayed pages (message 312). Similarly, application logic 306 communicates with abstraction layer 302 (message 316) for reading and writing of data through pushers and pullers 318. Data pushers and pullers 318 may also facilitate auto-populating and refreshing of data on various pages through page management infrastructure 304 (via, e.g., message 314). These standard behaviors can be overridden by, for example, adding new listener features within abstraction layer 302 and/or page management infrastructure 304 to intercept data values and special conditions in subsequent implementations. Alternatively, custom post processing in special methods could be used.

The pusher/puller arrangement described above allows for code re-use on various libraries 324, and provides a convenient and stable interface for user applets 212. In various situations, however, the user may wish to bypass the use of pushers and pullers, and instead access either API level 320 or (less preferably) library-specific code 322. Examples of instances when this bypass process may be useful include, without limitation, the following situations: (1) when SNMP delivers enumerated values, but it is desirable to display human-readable strings; (2) when it is desirable to load miscellaneous values that do not come from an SNMP table into a displayed table; (3) when a special MIB element has an unusual or non-supported format for its data to be written; and/or (4) when an SNMP data value is not directly loaded into a screen component, but instead affects several components in an unusual or complex way. Other situations may arise in various equivalent embodiments. Conversely, other embodiments may find ways to implement pushers/pullers even in these and other exceptional circumstances.

Figure 4:
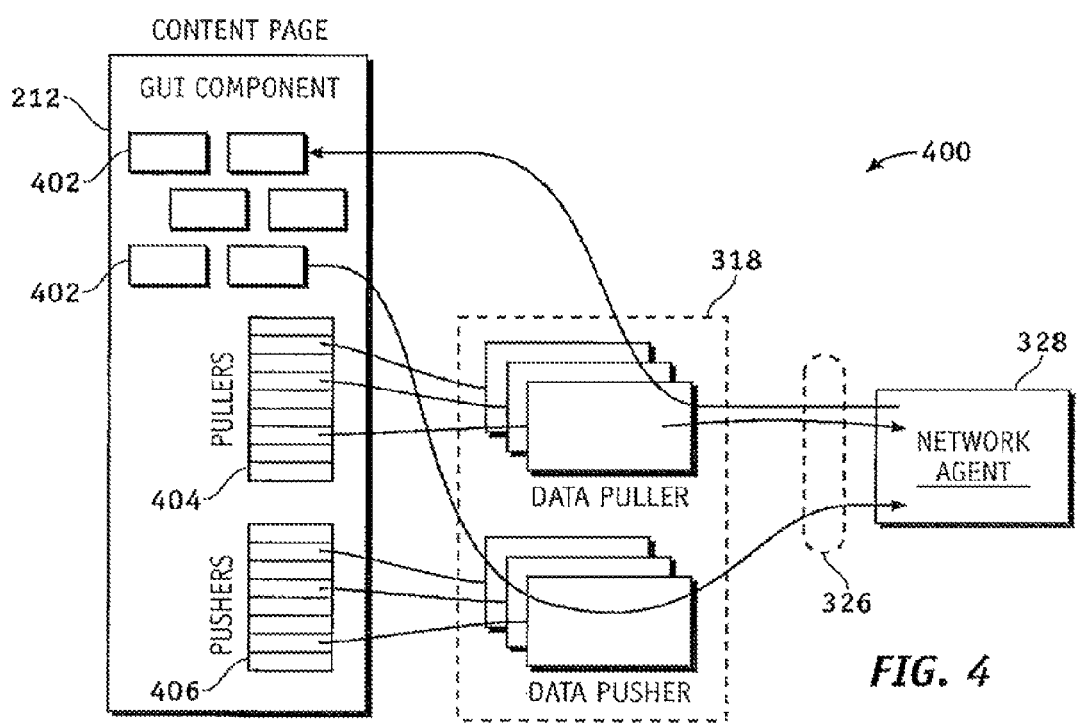
FIG. 4 is a block diagram showing data flows in an exemplary pusher/puller process.

With reference now to FIG. 4, an exemplary applet 212 suitably includes various component objects 402 as described above, as well as calls to various pullers 404 or pushers 406. These calls may be formatted in any manner, such as the standard interfaces described in FIGS. 5-6 as appropriate. When a puller 404 is called within applet 212 (or the page management infrastructure 304 (FIG. 3) associated with the applet), the corresponding logic in layer 318 suitably formats and/or posits a query to the appropriate network agent 328, which returns a response 413 using conventional SMTP or other standard formats. The response 413 is appropriately received by the data puller logic, which formats the response into a pre-determined interface format that can be returned to applet 212 for display or other processing. Pushers 406 similarly forward data 415 received in a pre-determined format defined by the interface to network agent 328 as message 416. Various types of pullers 404 and pushers 406 include mechanisms that could be used for simple data (e.g. text fields, checkboxes, labels, etc), tables, headless data (e.g. data stored in memory and/or used to implement a MAP interface) and/or the like. In various further embodiments, the various pushers and pullers in layer 318 may additionally validate data and/or execute other tasks as appropriate. Values being read/written can be checked, for example, and either vetoed (e.g. discarded) or modified if verification fails.

In still other embodiments, the various pusher/puller constructs in layer 318 may be used to implement a "listener" feature that allows for monitoring of changes in network data and/or user-entered data. Such information runs similar to a daemon or other process in that it "listens" for data changes that can be automatically or otherwise reported to the network agent 328 and/or to the applet 212 as appropriate. That is, data can be "pushed" to the network agent 328, "pulled" to the applet 212. Moreover, data can be validated as it is being transferred via the layer 318 constructs. Such data can then be vetoed and/or revised if it fails validation. Other features could be implemented across a wide array of equivalent embodiments as appropriate.

As noted above, the various pushers and pullers in layer 318 are generally implemented with well-defined interfaces to allow ready insertion into user applets 212. FIGS. 5 and 6 show examples of interfaces for exemplary pullers and pushers, respectively. As noted in FIG. 5, the interface for a puller 500 can be used to pull ("read") data from the SNMP or other data agent 328 for use in user applet 212. The interface for a pusher 600 can be similarly used to push ("write") data in the appropriate format out to data agent 328. Pusher 600 as shown also includes syntax 602 for clearing "dirty flags"; that is, for removing any indications that data changes have been made. This syntax may be useful, for example, following a data push to the MIB agent or the like.

While at least one example embodiment has been presented in the foregoing detailed description, it should be appreciated that a vast number of variations and equivalents exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. A network management system for allowing a user to interface with network management data provided by a network agent via a network, the network management system comprising:
   a display configured to present the network management data to the user;
   a hardware portion of a wireless switch to execute the following:
   application level logic configured to obtain and format the network management data to thereby create a user interface page for the display to present to the user;
   a library comprising software processing structures for sharing data with the network agent; and
   an abstraction layer distinct from the library and configured in communication with the application level logic, wherein the abstraction layer provides an interface between the application level logic and the library, and wherein the abstraction layer comprises a pusher feature configured to facilitate the writing of data from the application level logic to the network agent and a puller feature configured to facilitate the reading of data from the network agent to the application level logic, wherein the abstraction layer uses the library software processing structures to communicate with the network agent via the network while isolating the application level logic from the library by translating instructions for network management data from the application level logic to library software processing structure instructions and translating the network management data received from a library software processing structure to an interface format compatible with the application level logic.

2. The system of claim 1 wherein the abstraction layer isolates the application level logic from the library by translating instructions from the application level logic to library instructions.

3. The system of claim 2 wherein the abstraction layer further isolates the application level logic from the library by translating data received from the library to a pre-determined format that is compatible with the application level logic.

4. The system of claim 1 wherein the library is a simple network management protocol library.

5. The system of claim 1 wherein the abstraction layer further comprises code that is specific to the library and an application programming interface that facilitates communication between the pushers and the puller and the library-specific code.

6. The system of claim 1 further comprising a page management infrastructure configured to automatically call the pusher and the puller on behalf of the application level logic.

7. A network management system comprising:
a portion of a wireless switch hardware configured to accept and execute a management applet;
a plurality of access ports communicatively coupled to the wireless switch;
a plurality of mobile units, each communicatively coupled to at least one of the access ports; and
a memory of a wireless switch which stores a management information base (MIB) database
wherein the MIB stores: a plurality of MIB objects associated with a corresponding plurality of components; a plurality of MIB extensible markup language (XML) files, each of which is associated with a corresponding one of the plurality of MIB objects; and a plurality of software interfaces, each of which is associated with a corresponding one of the plurality of MIB XML files; and
wherein the applet is executable on a processor of the wireless switch and comprises a pusher feature configured to transfer data from the applet to the MIB and a puller feature configured to obtain data from the MIB on behalf of the applet, and wherein the pusher feature and the puller feature each communicate with the MIB via a software library interface and with the applet via a pre-determined interface that is different from the software library interface in order to isolate the management applet from the library by having the processor translating instructions for network data from the applet to library software instructions and translating the network data received from library software to an interface format compatible with the applet, and wherein the processor can create a user interface page of the network data for display to a user.

8. The system of claim 7, wherein the software interfaces comprise Java interfaces, and the applet comprises a Java applet.

9. The system of claim 8, wherein each Java interface includes one or more constant classes, wherein each constant class corresponds to a simple network management protocol object.

10. The system of claim 9, wherein each constant class includes an object identification of the SNMP object, the type of the SNMP object, and access information regarding the SNMP object.

11. A method for facilitating transfer of data between an application logic module and a remote network agent located across a network, wherein the application logic module is configured for presenting network management information to a user on a display, the method comprising:
receiving a request for the data from the application logic module at a data puller module;
isolating the application logic module from a software library by reformatting the request at the data puller module to a library format;
providing the re-formatted request from the data puller module to the software library associated with the remote network agent;
subsequently receiving a response message from the remote network agent at the data puller module via the software library;
further isolating the application logic module from a software library by translating the response message to a pre-determined interface format compatible with the application logic module;
forwarding the response message from the data puller module to the application logic module in the pre-determined interface format;
creating a user interface page of information in the response message; and
displaying the information for the user on a display.

12. The method of claim 11 wherein the reformatting step comprises translating the request from the pre-determined format to the library format.

13. The method of claim 11 wherein the receiving step is automatically initiated by a page management infrastructure on behalf of the application logic module.

14. The method of claim 11 wherein the receiving step is initiated directly by the application logic module.

15. The method of claim 11 further comprising the steps of:
creating a plurality of management information base (MIB) extensible markup language (XML) files, each of which is associated with a corresponding one of a plurality of MIB objects at the remote network agent;
creating a plurality of software interfaces, each of which is associated with a corresponding one of the plurality of MIB XML files; and
creating an applet using a subset of the plurality of software interfaces.

* * * * *

UNITED STATES PATENT AND TRADEMARK OFFICE
CERTIFICATE OF CORRECTION

| | | |
|---|---|---|
| PATENT NO. | : 8,027,362 B2 | Page 1 of 1 |
| APPLICATION NO. | : 11/680626 | |
| DATED | : September 27, 2011 | |
| INVENTOR(S) | : Jeghers | |

It is certified that error appears in the above-identified patent and that said Letters Patent is hereby corrected as shown below:

In Column 5, Line 22, delete "UT" and insert -- UI --, therefor.

Signed and Sealed this
Eighteenth Day of December, 2012

David J. Kappos
*Director of the United States Patent and Trademark Office*